United States Patent
Brockhaus

(10) Patent No.: US 12,504,307 B2
(45) Date of Patent: Dec. 23, 2025

(54) MAGNETIC-INDUCTIVE FLOWMETER AND METHOD OF OPERATING THE SAME

(71) Applicant: KROHNE Messtechnik GmbH, Duisburg (DE)

(72) Inventor: Helmut Brockhaus, Oberhausen (DE)

(*) Notice: Subject to any disclaimer, the term of this patent is extended or adjusted under 35 U.S.C. 154(b) by 413 days.

(21) Appl. No.: 18/191,252

(22) Filed: Mar. 28, 2023

(65) Prior Publication Data
US 2023/0304838 A1   Sep. 28, 2023

(30) Foreign Application Priority Data

Mar. 28, 2022  (DE) .................... 10 2022 107 279.7

(51) Int. Cl.
  *G01F 1/58*   (2006.01)
  *G01F 1/60*   (2006.01)
  *G01F 15/06*  (2022.01)
  *G01F 25/10*  (2022.01)

(52) U.S. Cl.
  CPC .............. *G01F 1/584* (2013.01); *G01F 1/586* (2013.01); *G01F 15/068* (2013.01); *G01F 1/588* (2013.01); *G01F 1/60* (2013.01); *G01F 25/10* (2022.01)

(58) Field of Classification Search
  CPC ........ G01F 1/584; G01F 1/586; G01F 15/068; G01F 25/01; G01F 1/60; G01F 1/588
  USPC ...................................... 73/861.12
  See application file for complete search history.

(56) References Cited

U.S. PATENT DOCUMENTS

| | | | |
|---|---|---|---|
| 7,546,212 B2 | 6/2009 | Schrag et al. | |
| 10,408,646 B2 | 9/2019 | Spahlinger et al. | |
| 2008/0016967 A1 | 1/2008 | Schrag et al. | |
| 2016/0045248 A1* | 2/2016 | Unger | A61B 18/1206 606/38 |
| 2016/0273948 A1* | 9/2016 | Tower, III | G01F 1/60 |
| 2017/0343396 A1 | 11/2017 | Spahlinger et al. | |

FOREIGN PATENT DOCUMENTS

| | | |
|---|---|---|
| DE | 102006033112 A1 | 1/2008 |
| DE | 102007014469 A1 | 9/2008 |
| DE | 102014119453 A1 | 6/2016 |
| DE | 102017130720 A1 | 6/2019 |
| EP | 3237849 B1 | 2/2020 |
| WO | 2020121101 A1 | 6/2020 |

* cited by examiner

Primary Examiner — Peter J Macchiarolo
Assistant Examiner — John M Royston
(74) Attorney, Agent, or Firm — Patrick D. Duplessis

(57) ABSTRACT

A magnetic-inductive flowmeter and a method for operating the flowmeter are disclosed. The flowmeter has a measuring tube, a magnetic field generator, and a controller with first and second measuring terminals. A medium is made to flow through the measuring tube. The controller performs the following steps: generating and feeding an emission signal and receiving a receive signal caused by the emission signal at the first measuring terminal and second measuring terminal; determining an impedance with an impedance amount and an impedance phase using the emission signal and the receive signal; and signaling a short circuit if the impedance amount is smaller than a first limit impedance amount and the impedance phase is larger than a limit impedance phase.

12 Claims, 2 Drawing Sheets

MAGNETIC-INDUCTIVE FLOWMETER AND METHOD OF OPERATING THE SAME

TECHNICAL FIELD

On the one hand, the invention relates to a magnetic-inductive flowmeter. On the other hand, the invention relates to a method of operating a magnetic-inductive flowmeter.

BACKGROUND

A known magnetic-inductive flowmeter has a measuring tube, a magnetic field generator, a first and a second measuring electrode, a first and a second measuring line and a controller with a first and a second measuring terminal. On the one hand, the first measuring electrode and the first measuring terminal are electrically connected to each other via the first measuring line, and on the other hand, the second measuring electrode and the second measuring terminal are electrically connected to each other via the second measuring line. The magnetic field generator is designed to generate a magnetic field in a medium flowing through the measuring tube, so that a flow signal present between the first measuring terminal and the second measuring terminal is induced in the medium. The controller is designed to determine a flow rate of the medium through the measuring tube using the flow rate signal. During operation of the magnetic-inductive flowmeter, a medium is made to flow through the measuring tube.

A method of operating a magnetic-inductive flowmeter is also known. The magnetic-inductive flowmeter also has a measuring tube, a magnetic field generator, a first and a second measuring electrode, a first and a second measuring line, and a controller having a first and a second measuring terminal. Here, too, the first measuring electrode and the first measuring terminal are electrically connected to each other via the first measuring line, on the one hand, and the second measuring electrode and the second measuring terminal are electrically connected to each other via the second measuring line, on the other hand. According to the method, a medium is made to flow through the measuring tube. A magnetic field is generated by the magnetic field generator in the medium flowing through the measuring tube, so that a flow signal present between the first and second measuring terminals is induced in the medium. A flow rate of the medium through the measuring tube is determined by the controller using the flow rate signal.

Usually, the controller is designed to control the magnetic field generator, and the magnetic field generator is designed to be controlled by the controller. Accordingly, the magnetic field generator is controlled by the controller during operation of the magnetic-inductive flowmeter.

The flow signal is thus induced into the medium, tapped from the first and second measuring electrodes, and conducted from the first and second measuring lines to the first and second measuring terminals of the controller. It is, on the one hand, proportional to a strength of the magnetic field and, on the other hand, proportional to a flow rate of the medium in the measuring tube. For example, it is a voltage. The flow rate of the medium is, for example, a volumetric flow rate or a mass flow rate.

A short circuit in the first and/or second measuring lines would falsify the flow signal present between the first and second measuring terminals, and thus the determination of the flow rate of the medium through the measuring tube. The first and second measuring lines may also be configured in multiple pieces and, in particular, may also comprise conductor tracks.

SUMMARY

The object of the present invention is thus to provide a magnetic-inductive flowmeter and a method for operating such a flowmeter, which makes it possible to determine such a short circuit.

The object is achieved, firstly, by a method having the features of claim 1. The method according to the invention modifies the previously described method initially in that the following method steps are additionally performed by the controller:

Generating and feeding in an emission signal and receiving a receive signal, which is caused by the emission signal, at the first and second measuring terminals. The emission signal is fed in and the receive signal is received in such a way that they neither influence signals for determining the flow rate nor are influenced by these signals.

Determining an impedance with an impedance amount and an impedance phase using the emission signal and the receive signal. Accordingly, the impedance between the first and second measuring terminals is determined by magnitude and phase.

Signaling a short circuit when the impedance magnitude is less than a first limit impedance magnitude and the impedance phase is greater than a limit impedance phase. Thus, the controller compares the determined impedance magnitude to the first limit impedance magnitude and the determined impedance phase to the limit impedance phase.

In this way, a reliable determination of a short circuit in the first and/or second measuring line is possible without inspecting the first and/or second measuring line itself.

For one design of the method, the magnetic-inductive flowmeter has a third and a fourth measuring line and the controller has a third and a fourth measuring terminal. On the one hand, the first measuring electrode and the third measuring terminal are electrically connected to each other via the third measuring line and, on the other hand, the second measuring electrode and the fourth measuring terminal are electrically connected to each other via the fourth measuring line.

The controller determines a line impedance of the first measuring line using the emission signal and a first measuring signal present between the first and third measuring terminals, and determines a line impedance of the second measuring line using the emission signal and a second measuring signal present between the second and fourth measuring terminals. Further, the controller considers the line impedance of the first measuring line and the line impedance of the second measuring line when determining the impedance. The first and second measurement signals are thereby caused by the emission signal. Preferably, current flows through the first and second measuring lines, but not through the third and fourth measuring lines. By taking into account the line impedance of the first measuring line and the line impedance of the second measuring line when determining the impedance, the determination of whether or not a short circuit is present becomes more reliable, since this determination is made with respect to the first limit impedance and the limit impedance phase.

For example, the first limit impedance is selected as 50 ohms, and the impedance phase is selected as −10°. Thus, a short circuit is signaled by the controller when, first, the impedance magnitude is less than 50 ohms and, second, the impedance phase is greater than −10°.

In a further design of the method, a short circuit is also signaled by the controller if the impedance amount is smaller than a second limit impedance amount. This second limit impedance amount is smaller than the first limit impedance amount. In this design, the signaling of a short circuit is independent of the impedance phase. This design further improves the reliability of the method. Namely, short circuits are also detected which have a very low impedance for a short circuit. These are characterized in that the impedance phase cannot be reliably determined.

The second limit impedance amount is selected as 2 ohms, for example. Thus, a short circuit is signaled by the controller when the impedance amount is less than 2 ohms.

In a further design, the emission signal is generated by the controller at a frequency between 500 Hz and 1 kHz. In an alternative design, the emission signal is generated by the controller with two frequencies between 500 Hz and 1 kHz. The use of an emission signal with a frequency in said frequency band or with two frequencies therein increases the reliability of the determination of the short circuit.

In a further design, the controller performs the determination of the impedance with additional use of a length of the first measuring line and a length of the second measuring line. This further increases the reliability of determining a short circuit.

The object is also achieved by a magnetic-inductive flowmeter having the disclosed features of claim 9. This is characterized in that the controller is designed as follows:
  Generating and feeding in an emission signal and receiving a receive signal acting from the emission signal at the first measuring terminal and second measuring terminal.
  Determining an impedance having an impedance amount and an impedance phase using the emission signal and the receive signal.
  Signaling a short circuit when the impedance amount is less than a first limit impedance amount and the impedance phase is greater than a limit impedance phase.

In one design, the magnetic-inductive flowmeter includes third and fourth measuring lines, and the controller includes third and fourth measuring terminals. On the one hand, the first measuring electrode and the third measuring terminal are electrically connected to each other via the third measuring line, and on the other hand, the second measuring electrode and the fourth measuring terminal are electrically connected to each other via the fourth measuring line.

The controller is designed, on the one hand, to determine a line impedance of the first measuring line using the emission signal and a first measuring signal present between the first and third measuring terminals and, on the other hand, to determine a line impedance of the second measuring line using the emission signal and a second measuring signal present between the second and fourth measuring terminals. Further, the controller is designed to consider the line impedance of the first measuring line and the line impedance of the second measuring line when determining the impedance.

In a further design, the controller is designed to perform one of the methods described above.

In all other respects, the explanations regarding the method for the magnetic-inductive flowmeter apply accordingly and vice versa.

BRIEF DESCRIPTION OF THE DRAWINGS

In detail, a multitude of possibilities are provided for designing and further developing the magnetic-inductive flowmeter and the method for operating a magnetic-inductive flowmeter. For this purpose, reference is made to the following description of preferred embodiments in connection with the drawings.

DETAILED DESCRIPTION

Figure 1:
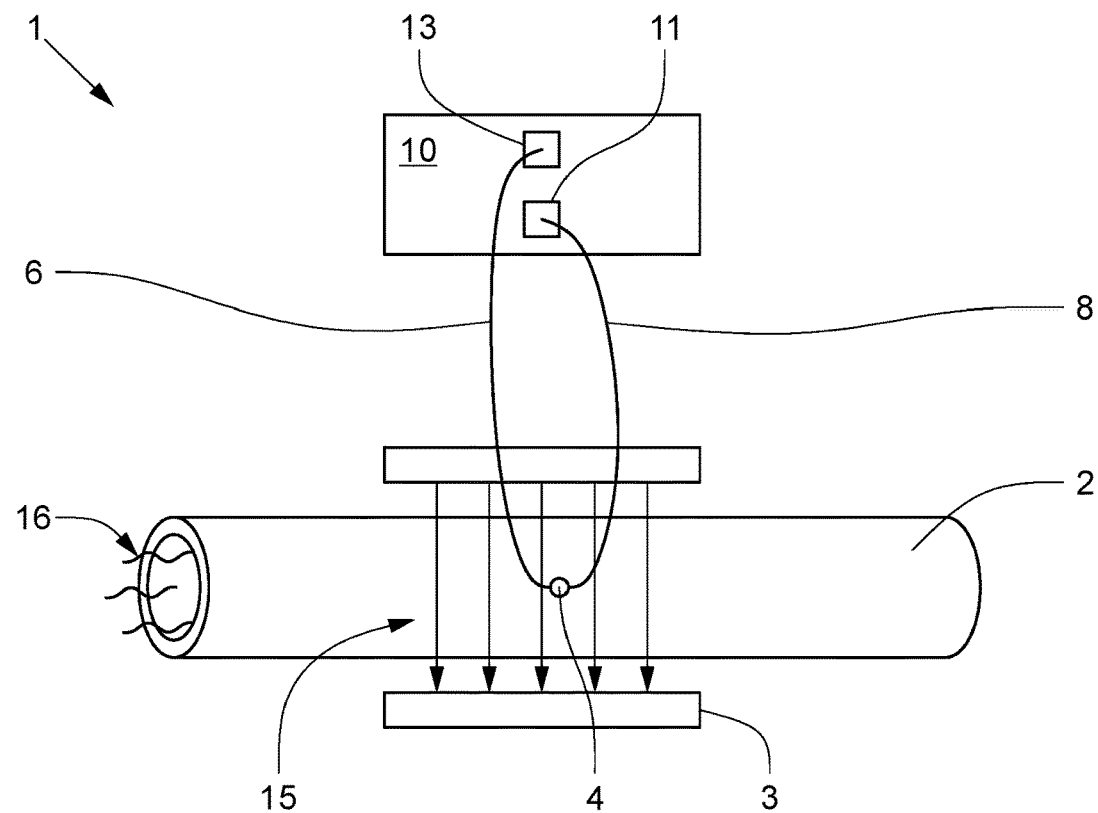
FIG. 1 illustrates an embodiment of a magnetic-inductive flowmeter in a first view.
Figure 2:
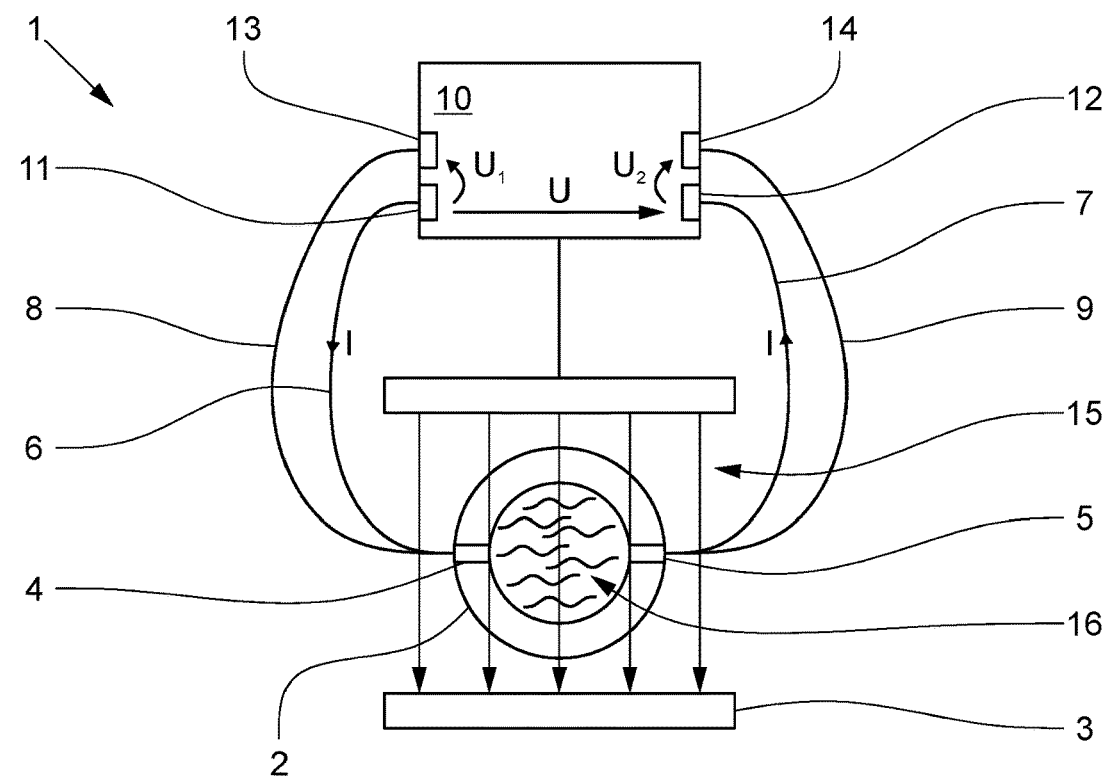
FIG. 2 illustrates the embodiment in a second view.

FIGS. 1 and 2 show in different views an abstracted representation of essential components of an embodiment of a magnetic-inductive flowmeter 1. The magnetic-inductive flowmeter 1 has a measuring tube 2, a magnetic field generator 3, a first measuring electrode 4, a second measuring electrode 5, a first measuring line 6, a second measuring line 7, a third measuring line 8, a fourth measuring line 9 and a controller 10 with a first measuring terminal 11, a second measuring terminal 12, a third measuring terminal 13 and a fourth measuring terminal 14.

The first measuring electrode 4 is electrically connected to the first measuring terminal 11 via the first measuring line 6 and to the third measuring terminal 13 of the controller 10 via the third measuring line 8. The second measuring electrode 5 is electrically connected on the one hand to the second measuring terminal 12 via the second measuring line 7 and on the other hand to the fourth measuring terminal 14 via the fourth measuring line 9.

The magnetic field generator 3 is designed to generate a magnetic field 15 in a medium 16 flowing through the measuring tube 2, so that a flow signal present between the first measuring terminal 11 and the second measuring terminal 12 is induced in the medium 16.

The controller 10 is designed to determine a flow rate of the medium 16 through the measuring tube 2 using the flow rate signal.

FIGS. 1 and 2 show the magnetic-inductive flowmeter 1 during operation, and therefore the medium 16 is made to flow through the measuring tube 2 and the magnetic field generator 3 generates the magnetic field 15 in the medium 16 flowing through the measuring tube 2 so that the flow signal present between the first measuring terminal 11 and the second measuring terminal 12 is induced into the medium 16. The magnetic field generator 3 is thereby controlled by the controller 10.

The controller 10 determines the flow rate of the medium 16 through the measuring tube 2 using the flow rate signal.

Figure 3:
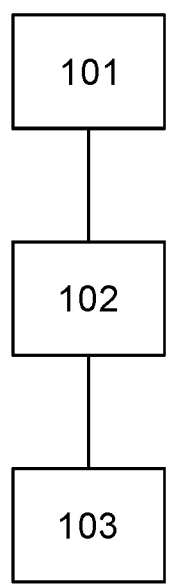
FIG. 3 illustrates a flowchart of an embodiment of a method for operating the magnetic-inductive flowmeter.

FIG. 3 shows a flowchart of an embodiment of a method for operating the magnetic-inductive flowmeter 1. The controller 10 is designed to perform this method and performs it since the magnetic-inductive flowmeter 1 is in operation.

In a first method step 101, an emission signal is generated and fed to the first measuring terminal 11 and second measuring terminal 12. Further, a receive signal caused by the emission signal is received.

In the present case, the emission signal is a current signal I which is impressed into the first measuring terminal 11. The current signal flows via the first measuring line 6, the first electrode 4, the medium 16, the second measuring electrode 5, the second measuring line 7 into the second measuring terminal 12. The receive signal is a voltage signal U, which is present between the first measuring terminal 11 and the second measuring terminal 12.

In a second method step 102, an impedance having an impedance amount and an impedance phase is determined using the emission signal and the receive signal. In the present case, the impedance is determined according to $Z=U/I$.

Further, using the emission signal and a first measuring signal present between the first measuring terminal 11 and the third measuring terminal 13, a line impedance of the first measuring line 6 is determined, and secondly, using the emission signal and a second measuring signal present between the second measuring terminal 12 and the fourth measuring terminal 14, a line impedance of the second measuring line 7 is determined. The line impedance of the first measuring line 6 and the line impedance of the second measuring line 9 are taken into account when determining the impedance.

In the present embodiment, the current signal I flows as the emission signal through the first measuring line 6 and the second measuring line 7, but not through the third measuring line 8 and through the fourth measuring line 9. In this embodiment, the third measuring terminal 13 and the fourth measuring terminal 14 have a high input impedance, so there is no current flowing through them that affects measurements. Thus, there is also no voltage drop due to the current signal I in the third measuring line 8 and the fourth measuring line 9. The first measuring signal is a first measuring voltage $U_1$ and the second measuring signal is a second measuring voltage $U_2$. The line impedance of the first measuring line 6 is thus $Z_1=U_1/I$ and that of the second measuring line 7 is $Z_2=U_2/I$.

In a third method step 103, a short circuit is signaled either when the impedance amount is smaller than a first limit impedance amount and the impedance phase is larger than a limit impedance phase, or, when the impedance amount is smaller than a second limit impedance amount independent of the impedance phase.

In this case, the controller 10 has been given 50 ohms as the first limit impedance amount, 2 ohms as the second limit impedance amount, and −10 degrees as the impedance phase. The emission signal is generated with two frequencies between 500 Hz and 1 kHz, namely with the frequency 500 Hz and the frequency 1 kHz.

The method and the determination of the flow do not interfere with each other because they are separated in time.

The invention claimed is:

1. A method for operating a magnetic-inductive flowmeter, wherein the magnetic-inductive flowmeter includes a measuring tube, a magnetic field generator, a first measuring electrode, a second measuring electrode, a first measuring line, a second measuring line and a controller having a first measuring terminal and a second measuring terminal wherein, on the one hand, the first measuring electrode and the first measuring terminal are electrically connected to one another via the first measuring line and, on the other hand, the second measuring electrode and the second measuring terminal are electrically connected to one another via the second measuring line, wherein a medium is made to flow through the measuring tube, wherein a magnetic field is generated by the magnetic field generator in the medium flowing through the measuring tube, so that a flow signal present between the first measuring terminal and the second measuring terminal is induced in the medium, wherein a flow rate of the medium through the measuring tube is determined by the controller using the flow signal, the method comprising:

generating and feeding a transmission signal and receiving a receive signal caused by the transmission signal at the first measuring terminal and second measuring terminal;

determining an impedance amount of an impedance;

determining an impedance phase of the impedance using the transmission signal and the receive signal; and signaling a short circuit in response to a determination that the determined impedance amount is less than 50 ohms and the determined impedance phase is greater than −10°.

2. The method according to claim 1, wherein the magnetic-inductive flowmeter includes a third measuring line and a fourth measuring line and the controller includes a third measuring terminal and a fourth measuring terminal;

wherein, on the one hand, the first measuring electrode and the third measuring terminal are electrically connected to one another via the third measuring line and, on the other hand, the second measuring electrode and the fourth measuring terminal are electrically connected to one another via the fourth measuring line;

wherein, on the one hand, a line impedance of the first measuring line is determined by the controller using the transmission signal and a first measuring signal present between the first measuring terminal and the third measuring terminal and, on the other hand, a line impedance of the second measuring line is determined using the transmission signal and a second measuring signal present between the second measuring terminal and the fourth measuring terminal; and wherein the line impedance of the first measuring line and the line impedance of the second measuring line are taken into account by the controller when determining the impedance.

3. The method according to claim 1, wherein the transmission signal is generated by the controller with a frequency between 500 Hz and 1 KHz.

4. The method according to claim 1, wherein the transmission signal is generated by the controller with two frequencies between 500 Hz and 1 kHz.

5. The method according to claim 1, wherein the steps of determining the impedance amount and determining the impedance phase are performed by the controller with additional use of a length of the first measuring line and a length of the second measuring line.

6. A magnetic-inductive flowmeter, comprising:

a measuring tube;

a magnetic field generator;

a first measuring electrode;

a second measuring electrode;

a first measuring line;

a second measuring line; and a controller with a first measuring terminal and a second measuring terminal; and wherein, on the one hand, the first measuring electrode and the first measuring terminal are electrically connected to one another via the first measuring line and, on the other hand, the second measuring electrode and the second measuring terminal are electrically connected to one another via the second measuring line;

wherein the magnetic field generator is designed to generate a magnetic field in a medium flowing through the measuring tube, so that a flow signal present between the first measuring terminal and the second measuring terminal is induced in the medium;

wherein the controller is designed to determine a flow rate of the medium through the measuring tube using the flow signal;

wherein the controller is designed as follows:

generating and feeding a transmission signal and receiving a receive signal caused by the transmission signal at the first measuring terminal and second measuring terminal;

determining an impedance amount of an impedance;

determining an impedance phase of the impedance using the transmission signal and the receive signal; and signaling a short circuit in response to a determination that the determined impedance amount is less than 50 ohms and the determined impedance phase is greater than −10°.

7. The magnetic-inductive flowmeter according to claim 6, wherein the magnetic-inductive flowmeter has a third measuring line and a fourth measuring line and the controller has a third measuring terminal and a fourth measuring terminal;

wherein, on the one hand, the first measuring electrode and the third measuring terminal are electrically connected to one another via the third measuring line and, on the other hand, the second measuring electrode and the fourth measuring terminal are electrically connected to one another via the fourth measuring line;

wherein the controller is designed, on the one hand, to determine a line impedance of the first measuring line using the transmission signal and a first measuring signal present between the first measuring terminal and the third measuring terminal and, on the other hand, to determine a line impedance of the second measuring line using the transmission signal and a second measuring signal present between the second measuring terminal and the fourth measuring terminal; and wherein the controller is designed to take into account the line impedance of the first measuring line and the line impedance of the second measuring line when determining the impedance.

8. A method for operating a magnetic-inductive flowmeter, comprising:

generating and feeding a transmission signal to a first measuring terminal and a second measuring terminal;

receiving a receive signal caused by the transmission signal at the first measuring terminal and second measuring terminal;

determining an impedance amount of an impedance;

determining an impedance phase of the impedance using the transmission signal and the receive signal; and signaling a short circuit in response to a determination that the determined impedance amount is less than 50 ohms and the determined impedance phase is greater than −10°.

9. The method according to claim 8, further comprising:

determining a first line impedance of a first measuring line using the transmission signal and a first measuring signal present between the first measuring terminal and a third measuring terminal, wherein the first measuring line electrically connects the first measuring terminal to a first electrode;

determining a second line impedance of a second measuring line using the transmission signal and a second measuring signal present between the second measuring terminal and a fourth measuring terminal, wherein the second measuring line electrically connects the second measuring terminal to a second electrode;

wherein the step of determining the impedance involves taking into account the first line impedance and the second line impedance.

10. The method according to claim 8, wherein the transmission signal has a frequency between 500 Hz and 1 KHz.

11. The method according to claim 8, wherein the transmission signal has two frequencies between 500 Hz and 1 KHz.

12. The method according to claim 8, wherein the steps of determining the impedance amount and determining the impedance phase involve use of a length of a first measuring line and a length of a second measuring line.

* * * * *